(12) United States Patent
Kim

(10) Patent No.: US 6,570,634 B2
(45) Date of Patent: May 27, 2003

(54) TRANSFLECTIVE COLOR LCD DEVICE

(75) Inventor: Yong-Beom Kim, Kyonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 121 days.

(21) Appl. No.: 09/827,317

(22) Filed: Apr. 6, 2001

(65) Prior Publication Data

US 2002/0036732 A1 Mar. 28, 2002

(30) Foreign Application Priority Data

Apr. 7, 2000 (KR) ........................ 2000-18321

(51) Int. Cl.[7] ............................................. G02F 1/1347
(52) U.S. Cl. ..................................... 349/107; 349/114
(58) Field of Search ...................... 349/114, 74, 75, 349/78–82, 86, 117, 107–109; 438/38

(56) References Cited

U.S. PATENT DOCUMENTS 6,483,613 B1 * 11/2002 Woodgate et al. ............. 359/19

FOREIGN PATENT DOCUMENTS

KR     1999-63559     7/1999

* cited by examiner

Primary Examiner—Jey Tsai
(74) Attorney, Agent, or Firm—Morgan, Lewis & Bockius LLP

(57) ABSTRACT

A transflective liquid crystal display device includes first and second transparent substrates opposing each other, a transparent pixel electrode on an inner surface of the first transparent substrate, a first passivation layer on the transparent pixel electrode, a reflective pixel electrode on the first passivation layer, the reflective pixel electrode having a through hole passing through the first passivation layer such that the through hole exposes the transparent pixel electrode, a lower polarizer on an exterior surface of the first transparent substrate, a back light below the lower polarizer, a color filter layer on an inner surface of the second transparent substrate, a second passivation layer on the color filter layer, a common electrode on the second passivation layer, the common electrode having a concavity formed toward the upper substrate, the concavity corresponding to the through hole of the reflective electrode, a retardation layer on an exterior surface of the second transparent substrate; an upper polarizer on the retardation layer; and a liquid crystal layer between the common electrode and the reflective pixel electrode, and between the concavity of the common electrode and an exposed portion of the transparent pixel electrode.

8 Claims, 5 Drawing Sheets

TRANSFLECTIVE COLOR LCD DEVICE

This application claims the benefit of Korean patent application No. 2000-18321, filed Apr. 7, 2000, which is hereby incorporated by reference.

BACKGROUND OF THE INVENTION

1. Field of the Invention

The present invention relates to a liquid crystal display device, and more particularly to a transflective liquid crystal display (LCD) device implementing a liquid crystal layer having different cell gaps.

2. Discussion of the Related Art

As an information-oriented society rapidly develops, display devices are accordingly developed. The display device processes and displays a great deal of information. A cathode ray tube (CRT) has served as a mainstream of the display device field. However, to meet the needs of the times, a flat panel display device having small size, light weight, and low power consumption is a subject of research.

A thin film transistor liquid crystal display (TFT LCD) device is an example of the flat panel display device. The TFT LCD device is very thin and provides superior color display properties. For operation, a thin film transistor serves as a switching element of the TFT LCD device. The thin film transistor of the TFT LCD device switches a pixel such that the pixel controls a transmittance of light, which is incident from a back light of the TFT LCD device. An amorphous silicon layer is widely used for a silicon (active) layer of the thin film transistor, because it can be formed on a large, but relatively cheap, glass substrate at a relatively low temperature. The above-mentioned amorphous silicon TFT (a-Si:TFT) is frequently used for thin film transistors.

In general, the LCD devices are divided into transmissive LCD devices and reflective LCD devices according to whether the display uses an interior or exterior light source.

A typical transmissive TFT LCD device includes a liquid crystal panel and a back light. The liquid crystal panel includes upper and lower substrates with a liquid crystal layer interposed in between. The upper substrate includes a color filter, and the lower substrate includes thin film transistors (TFTS) as switching elements. An upper polarizer is arranged on the liquid crystal panel, and a lower polarizer is arranged between the liquid crystal panel and the back light. However, since the transmissive TFT LCD transmits just 3 to 8% of the incident rays of light from the back light, it is very inefficient in terms of its power consumption.

Specifically, the two polarizers have a transmittance of 45%, and the two substrates have a transmittance of 94%. The TFT array and the pixel electrode have a transmittance of 65%, and the color filter has a transmittance of 27%. Therefore, the typical transmissive TFT LCD device has a transmittance of about 7.4% as shown in FIG. 1, which shows an accumulated transmittance (in brightness %) after light passes through each layer of the device. For this reason, the transmissive TFT LCD device requires a high back light brightness, and thus electric power consumed by the back light increases. A relatively heavy battery is needed to supply sufficient power to the back light of such a device. However, the battery rapidly discharges.

Unlike transmissive TFT LCD device, the reflective LCD device uses an ambient light incident from a natural light source or an exterior artificial light source. Because of its low power consumption, the reflective TFT LCD device is often preferred. However, the reflective TFT LCD device is useless when the weather or exterior light source is dark.

Accordingly, a transflective TFT LCD device has been developed to compensate for the reflective TFT LCD device. The transflective TFT LCD device is useful regardless of the weather or exterior light source. FIG. 2 is a partial cross-sectional view illustrating a typical transflective TFT LCD device. For the sake of convenience, FIG. 2 shows just one pixel portion of the transflective TFT LCD device.

As shown in FIG. 2, the transflective LCD device includes upper and lower substrates 60 and 50 opposing to each other, a liquid crystal layer 80 interposed between the upper and lower substrates, and a back light 70 under the lower substrate 50. First and second electrodes 62 and 64 apply electric field to the liquid crystal layer 80. The first electrode 62 is called a common electrode, since it covers the entire substrate 60, whereas the second electrode 64 is called a transparent pixel electrode, since it is independently arranged for every pixel unit. The first and second electrodes are arranged, respectively, at the upper and lower substrates 60 and 50 that sandwich the liquid crystal material 80. The first and second electrodes 62 and 64 are formed of transparent conducting material, such as indium tin oxide (ITO) or indium zinc oxide (IZO). In addition, a color filter layer 68 is interposed between the upper substrate 60 and first electrode 62.

Surrounding the second electrode 64 there is a reflective pixel electrode 52 having a through hole 54. The through hole 54 corresponds to the second electrode 64 such that it has a width of "ΔL" in its cross-section, and serves to transmits incident light that is incident from the back light 70. For a reflective mode, first incident rays 72 are incident from an exterior light source (not shown) to the reflective pixel electrode 52, and the reflective pixel electrode 52 reflects them to the upper substrate 60 having the color filter layer 68. For a transmissive mode, second incident rays 74 are incident from the back light 70, and the transparent pixel electrode 64, the second electrode, transmits the rays to the upper substrate 60 without a phase difference.

For operation, a switching element (not shown) formed on the lower substrate 50 applies electric signals to the reflective and transparent pixel electrodes 52 and 64 such that an electric field is induced across the liquid crystal layer 80. Then, the liquid crystal layer 80 changes its alignment in accordance with the electric field such that the first or second incident rays 72 and 74 gets a selective phase difference after passing through the liquid crystal layer 80. Then, the first and second rays 72 and 74 pass through the color filter layer 68 such that a color image is produced. At this point, retardation layers and polarizers (see FIG. 3) are further formed on exterior surface of the upper and lower substrates 60 and 50, to modulate the first and second incident rays 72 and 74.

Various elements for a transflective LCD device according to a related art will be explained with reference to FIG. 3. FIG. 3 is a conceptual cross-sectional view illustrating the transflective LCD device according to the related art. A color filter layer (reference 68 of FIG. 2) is omitted in FIG. 3 for the sake of convenience, because it does not affect the modulation of the incident rays.

As shown in FIG. 3, a lower substrate 100 includes a first transparent substrate 106, a reflective electrode 108, a transparent electrode 110, a first retardation film 104, and a lower polarizer 102. The reflective and transparent electrodes 108 and 110 are formed on an inner surface of the first transparent substrate 106, whereas the first retardation film 104 and the lower polarizer 102 are sequentially formed on an exterior surface thereof. A back light 70 is positioned below the lower substrate 100. The first retardation film 104 is beneficially a quarter wave plate involving a phase difference of $\lambda/4$ ($\lambda$ being the wavelength of incident light).

In the meanwhile, an upper substrate 200 includes a second transparent substrate 206, a common electrode 208, a second retardation film 204, and an upper polarizer 202. The common electrode 208 is formed on an inner surface of the second transparent substrate 206, whereas the second retardation film 204 and the upper polarizer 202 are sequentially formed on an exterior surface thereof. Between the upper and lower substrate 200 and 100, a liquid crystal layer 300 is interposed. The second retardation film 204 is also preferably the quarter wave plate (QWP). As previously explained, the quarter wave plate involves the phase difference of $\lambda/4$. That is to say, after a linearly polarized ray passes through the quarter wave plate (QWP), it is circularly polarized in a right or left direction. In addition, after a right-circularly-polarized ray (RCP) or left-polarized ray (LCP) passes through the QWP, it becomes a linearly polarized ray having a vibration direction of 45 degrees or 135 degrees. In addition, the liquid crystal layer 300 preferably has designed cell gaps, such that the liquid crystal layer 300 serves as a QWP without an electric field (off state), and serves as an isotropic medium with an electric field (on state). Specifically, a first cell gap d1 is measured between the transparent layers.

Now, with reference to FIGS. 4A, 4B, 5A, and 5B, operation of the typical transflective LCD device shown in FIG. 3 are explained. At this point, it is assumed that a user's view is fixed in a downward direction from the upper substrate to the lower substrate of the transflective LCD device.

FIGS. 4A and 4B, respectively, illustrate off and on states for a transmissive mode of the typical transflective LCD device. At first as shown in FIG. 4A, incident rays (reference 74 of FIG. 2) from the back light 70 pass through the lower polarizer 102 and are linearly polarized to have a first vibration direction of 135 degrees. That is, the lower polarizer 102 has a first transmittance axis that corresponds to the first vibration direction, such that only a portion of the incident rays 74 that is parallel to the first transmittance axis is transmitted through the lower polarizer 102. Thereafter, first linearly polarized rays pass through the first retardation layer 104, the first QWP, and are left circularly polarized. The left-circularly polarized (LCP) rays subsequently pass through the transparent pixel electrode 110 without a phase change and meet the liquid crystal layer 300 in off state. Since the liquid crystal layer 300 is in an off state, it serves as a QWP with a phase difference of $\lambda/4$. Therefore, the LCP rays change to second linearly polarized rays having the same vibration direction as the first linearly polarized rays. The second linearly polarized rays subsequently pass through the second retardation layer 204, the second QWP, and are right-circularly polarized. Then, the right-circularly polarized (RCP) rays are incident upon the upper polarizer 202. The upper polarizer 202 has a second transmittance axis that is preferably perpendicular to the first transmittance axis of the lower polarizer 102. Since the RCP rays have rotating vibration directions, portions of the rays have a vibration direction that is parallel to the second transmittance axis of the upper polarizer 202. Therefore, the upper polarizer 202 transmits only these portions of the RCP rays such that a gray state is achieved, instead of a normally white state.

Unlike the off state for the transmissive mode, the on state shown in FIG. 4B produces a normally black state. All the elements except for the liquid crystal layer 300 involve the same phase difference as in FIG. 4A. When an electric field is applied across the liquid crystal layer, the liquid crystal layer 300 serves as an isotropic optical medium. Therefore, after passing through the transparent pixel electrode, the LCP rays pass through the liquid crystal layer 300 without a phase difference. Then, the LCP rays meet the second retardation layer 204, or the second QWP. The second retardation layer 204 changes the LCP rays to the second linearly polarized rays having the same vibration direction as the first linearly polarized rays. That is, the second linearly polarized rays vibrate perpendicular to the second transmittance axis of the upper polarizer 202. Therefore, all the second linearly polarized rays are absorbed or reflected by the upper polarizer 202 such that the normally black state is achieved for the transmissive mode of the transflective LCD device.

FIGS. 5A and 5B illustrate off and on states for a reflective mode of the transflective LCD device. At first, as shown in FIG. 5A, incident rays (reference 72 of FIG. 2) are incident from an exterior light source 78 to the upper polarizer 202. Since the upper polarizer 202 has a transmittance axis in a direction of 45 degrees, the incident rays change to first linearly polarized rays. A vibration direction of the first linearly polarized rays is parallel to the transmittance axis of the upper polarizer 202. The first linearly polarized rays pass through the second retardation layer 204 and change to RCP rays. Then, the RCP rays pass through the liquid crystal layer 300 and change to second linearly polarized rays, which vibrate perpendicular to the first transmittance axis of the upper polarizer 202. The second linearly polarized rays are subsequently incident on the reflective electrode 108, and are reflected toward the liquid crystal layer 300. The liquid crystal layer 300 changes the reflected rays to LCP rays. Then, the LCP rays pass through the second retardation layer 204, and change to third linearly polarized rays having the same vibration direction as the first linearly polarized rays. Since the vibration direction of the third linearly polarized rays are parallel to the transmittance axis of the upper polarizer 202, the upper polarizer 202 transmits all of the third linearly polarized rays such that a normally white state is achieved.

Unlike the state for the reflective mode, the on state shown in FIG. 5B produces a normally black state. All the elements except for the liquid crystal layer 300 involve the same phase difference as in FIG. 5A. When an electric field is applied across the liquid crystal layer, the liquid crystal layer 300 serves as an isotropic medium for rays of light. Therefore, after passing through the second retardation layer 204, the RCP rays pass through the liquid crystal layer 300 without a phase change. Then, the reflective electrode 108 reflects the LCP rays to the liquid crystal layer 300. Since the liquid crystal layer 300 involves no phase change, the LCP rays subsequently meet the second retardation layer 204. The second retardation layer 204 changes the LCP rays to be linearly polarized, with a vibration direction perpendicular to the transmittance axis of the upper polarizer 202. Therefore, all the rays are absorbed by the upper polarizer 202 such that a normally black state is achieved.

As explained above, the transflective LCD device have the reflective mode, as well as the transmissive mode. Therefore, the transflective LCD device can be used regardless of the exterior light source condition. However, as shown in FIG. 4A, the transmissive mode of the conventional transflective LCD device provides the gray state instead of the normally white state. That is to say, in the off state for the transmissive mode shown in FIG. 4A, circularly polarized rays are incident on the upper polarizer 202. Since only a portion of the circularly polarized rays passes through the upper polarizer 202, transmittance of the transmissive mode is at most half of reflectance of the reflective mode.

The conventional transflective LCD device is usually designed with the reflective mode in mind. That is, the first and second cell gaps d1 and d2 shown in FIG. 3 are conventionally designed to have the same value. In other words, for the off state, the liquid crystal layer of the conventional transflective LCD device serves as a quarter wave plate (QWP) regardless of the transmissive or reflective mode. That is to say, the liquid crystal layer involves the phase difference of $\lambda/4$ for both the transmissive and reflective modes. If the first and second cell gaps are properly designed in accordance with the reflective and transmissive modes, the transflective LCD device may modulate the incident rays more efficiently.

SUMMARY OF THE INVENTION

Accordingly, the present invention is directed to a transflective LCD device that substantially obviates one or more of the problems due to limitations and disadvantages of the related art.

An object of the present invention is to provide a transflective LCD device that has a relatively high luminance for a transmissive mode.

In order to achieve the above object, in one aspect, the preferred embodiment of the present invention provides a transflective liquid crystal display device including first and second transparent substrates opposing each other, a transparent pixel electrode on an inner surface of the first transparent substrate, a first passivation layer on the transparent pixel electrode, a reflective pixel electrode on the first passivation layer, the reflective pixel electrode having a through hole passing through the first passivation layer such that the through hole exposes the transparent pixel electrode, a lower polarizer on an exterior surface of the first transparent substrate, a back light below the lower polarizer, a color filter layer on an inner surface of the second transparent substrate, a second passivation layer on the color filter layer, a common electrode on the second passivation layer, the common electrode having a concavity formed toward the upper substrate, the concavity corresponding to the through hole of the reflective electrode, a retardation layer on an exterior surface of the second transparent substrate; an upper polarizer on the retardation layer; and a liquid crystal layer between the common electrode and the reflective pixel electrode, and between the concavity of the common electrode and an exposed portion of the transparent pixel electrode.

A first cell gap d1 is measured between the common electrode and reflective pixel electrode, a second cell gap d2 is measured between the concavity of the common electrode and an exposed portion of the transparent pixel electrode, and the cell gap ratio d2/d1 is preferably 1.5 to 2.5, and more preferably 1.8 to 2.2.

The retardation layer is a half wave plate that involves a phase difference of $\lambda/2$. Optionally, the retardation layer is a quarter wave plate that involves a phase difference of $\lambda/4$, and the device further includes a quarter wave plate between the first transparent substrate and lower polarizer.

The device further includes upper and lower alignment layers, the upper and lower alignment layers directly facing, respectively, upper and lower surfaces of the liquid crystal layer.

The first and second passivation layers are preferably transparent thin films.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, which are illustrated in the accompanying drawings.

Figure 6:
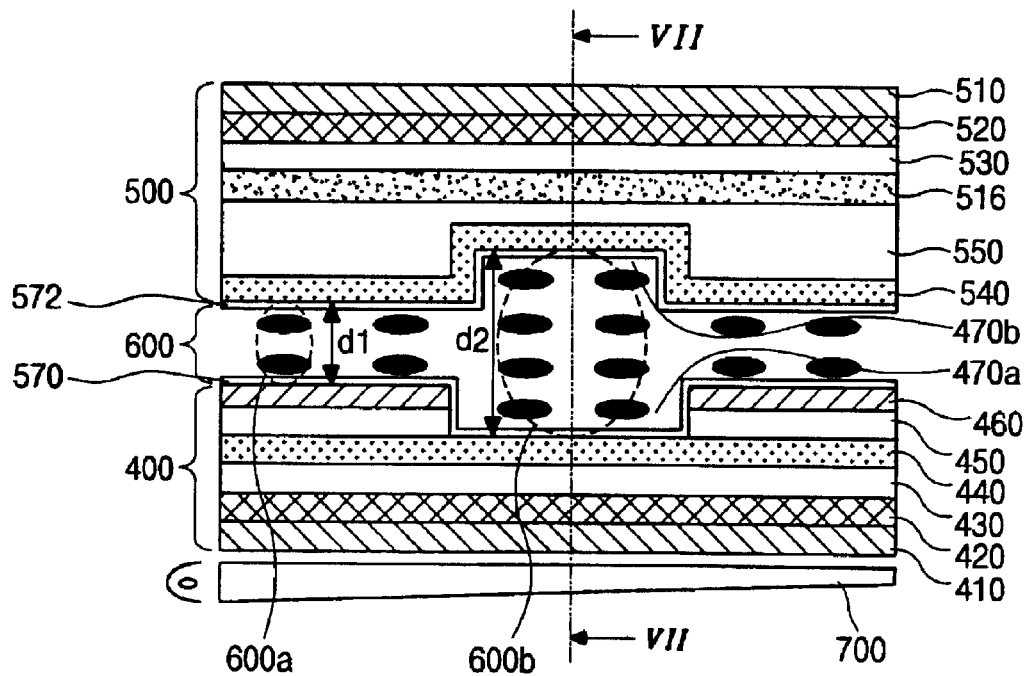
FIG. 6 is a cross-sectional view illustrating a transflective LCD device according to a first preferred embodiment of the present invention.

FIG. 6 shows a cross-sectional view illustrating a transflective LCD device according to a first preferred embodiment. A liquid crystal layer 600 is interposed between lower and upper substrates 400 and 500, and a back light 700 is disposed below the lower substrate 400.

The lower substrate 400 includes a first transparent substrate 430. A transparent pixel electrode 440 is formed on an inner surface of the transparent substrate 430. A first passivation layer 450 and a reflective pixel electrode 460 are sequentially formed on the transparent pixel electrode 440. Preferably, the first passivation layer 450 is a transparent thin film. A through hole 470a is disposed through the reflective pixel electrode 460 and the first passivation layer 450 such that a portion of the transparent pixel electrode 440 is exposed. The through hole 470a serves as a first transmissive portion. In other words, the reflective pixel electrode 460 surrounds the first transmissive portion 470a (the first through hole).

In addition, a first QWP (quarter wave plate) 420 and a lower polarizer 410 are sequentially disposed on an exterior surface of the first transparent substrate 430. The first QWP 420 preferably generates a phase difference of $\lambda/4$.

The upper substrate 500 includes a second transparent substrate 530. A color filter layer 516 is formed on an inner surface of the second transparent substrate 530, whereas a second QWP 520 and an upper polarizer 510 are sequentially disposed on an exterior surface thereof. In addition, a second passivation layer 550 is formed on the color filter layer 516. The second passivation layer 550 is preferably the transparent thin film and includes a concavity 470b, which corresponds to the first transmissive portion 470a. The concavity 470b serves as a second transmissive portion and should not expose the color filter layer 516. Furthermore, a common electrode 540 is formed on the second passivation layer 550 including the second transmissive portion 470b.

Because of the first and second transmissive portions 470a and 470b, the liquid crystal layer 600 is divided into first and second liquid crystal portions 600a and 600b. The first liquid crystal portion 600a corresponds to a reflective portion or the reflective electrode 460, whereas the second liquid crystal portion 600b corresponds to a transmissive portion or the first and second transmissive portions 470a and 470b. The first and second liquid crystal portions 600a and 600b respectively have first and second cell gaps d1 and d2. Specifically, the first cell gap d1 is measured for the reflective portion between the reflective electrode 460 and common electrode 540, whereas the second cell gap d2 is measured for the first and second transmissive portions 470a and 470b between the common electrode 540 and the transparent pixel electrode 440. A relationship between the first and second cell gaps d1 and d2 is about d2=2 d1. For designing the cell gap ratio d2/d1, manufacturing tolerances or many other factors are considered. Therefore, a cell gap ratio d2/d1 is preferably 1.5 to 2.5, more preferably or 1.8 to 2.2. At this point, the second cell gap d2 depends on an accumulated depth of the first and second transmissive portions 470a and 470b. In other words, the second sell gap d2 is dependent on a height of the first passivation layer 450 as well as a depth of the concavity 470b.

In addition, lower and upper alignment layers 570 and 572 are preferably formed on the reflective electrode 460 and common electrode 540, respectively. The alignment layers provide a first state of alignment for the liquid crystal layer 600. The lower alignment layer 570 is further formed on the exposed surface of the transparent pixel electrode 440.

Figure 1:
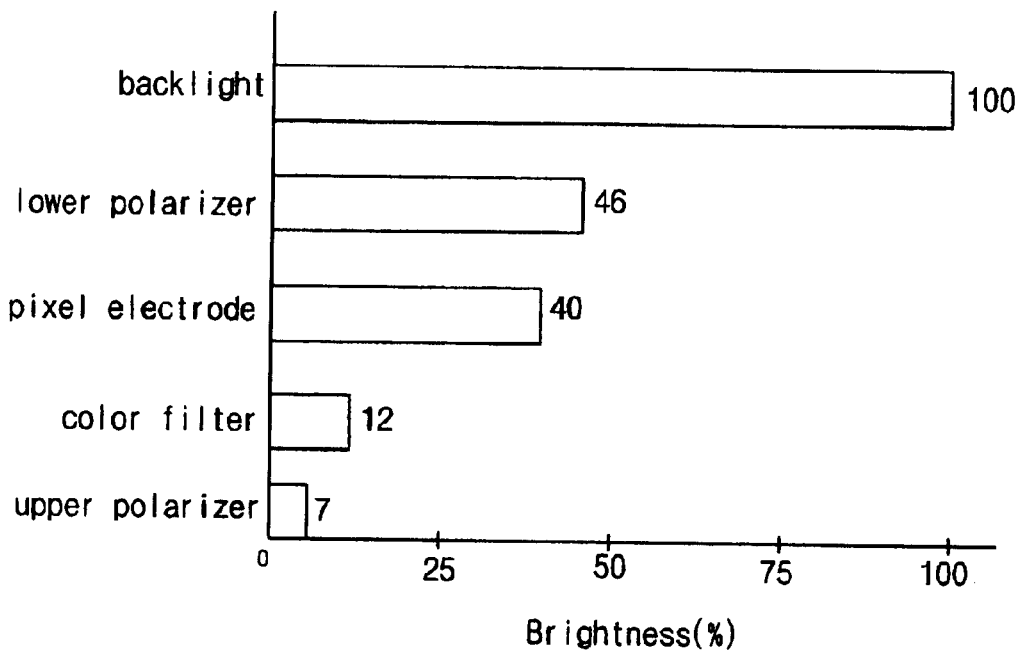
FIG. 1 is a graph illustrating an accumulated transmittance (in brightness %) after light passes through each layer of a transmissive LCD device.
Figure 2:
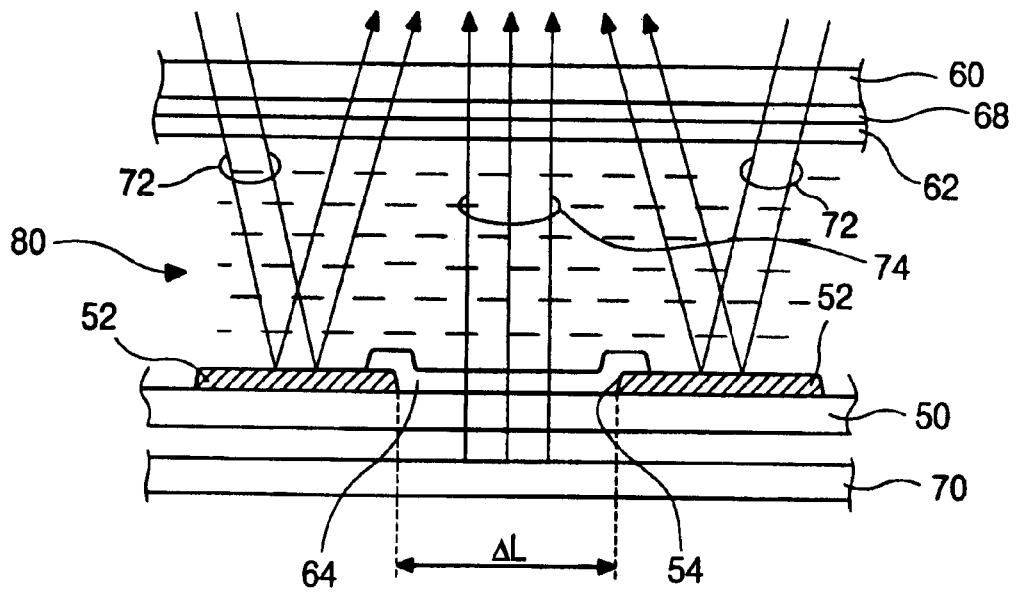
FIG. 2 is a cross-sectional view illustrating an operation of a typical transflective LCD device.
Figure 3:
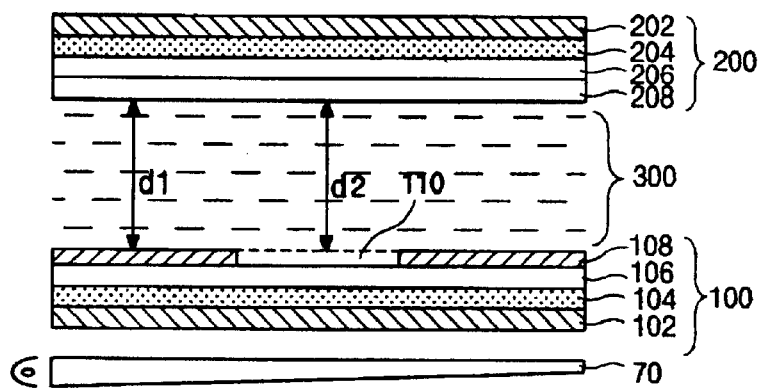
FIG. 3 is a conceptual cross-sectional view illustrating a transflective LCD device according to the related art.
Figure 7:
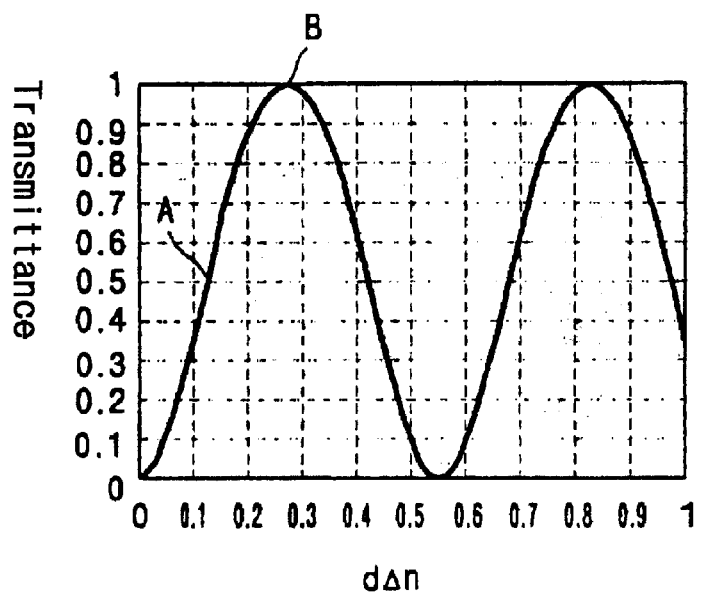
FIG. 7 is a graph illustrating a transmittance with respect to a phase difference taken along a line VII—VII of FIG. 6.

FIG. 7 shows a transmittance with respect to a phase difference (d Δn) taken along a line VII—VII of FIG. 6. Jones matrix is used to produce the graph of FIG. 7, and the graph is used to find an optimum value for the second cell gap d2 of the second liquid crystal portion 600b. At this point, the first cell gap d1 of first liquid crystal portion 600a is fixed such that the first liquid crystal portion 600a involves a phase difference of $\lambda/4$, where "$\lambda$" is 550 nm. In FIG. 7, a first point "A" corresponds to a relationship d2=d1, shown in FIG. 3, whereas a second point "B" corresponds to an inventive relationship of d2=2 d1 shown in FIG. 6. At the first point "A", the transmittance is 0.5, or 50%. However, the transmittance is 1, or 100% at the second point "B". That is, a transmissive portion of the conventional transflective LCD device shown in FIG. 3 has a lower transmittance of 50% in off state. However, the transmissive portion of the transflective LCD device of the present invention has a higher transmittance of 100% in off state.

In other words, the first liquid crystal portion 600a has the first cell gap d1 to generate a first phase difference of $\lambda/4$ in off state. The second liquid crystal portion 600b has the second cell gap d2, which is preferably twice as large as the first cell gap d1, such that the second liquid crystal portion 600b involves a second phase difference of $\lambda/2$ in the off state. Therefore, the first liquid crystal portion 600a serves as a QWP in its off state, whereas the second liquid crystal portion 600b serves to rotate only a vibration direction of rays by 90 degrees in its off state. The relationships between the first and second cell gaps are shown as follows:

d1/n=$\lambda/4$ (for the reflective portion), at this point, d2=2 d1, accordingly, d2/n=$\lambda/2$ (for the transmissive portion).

Figure 8:
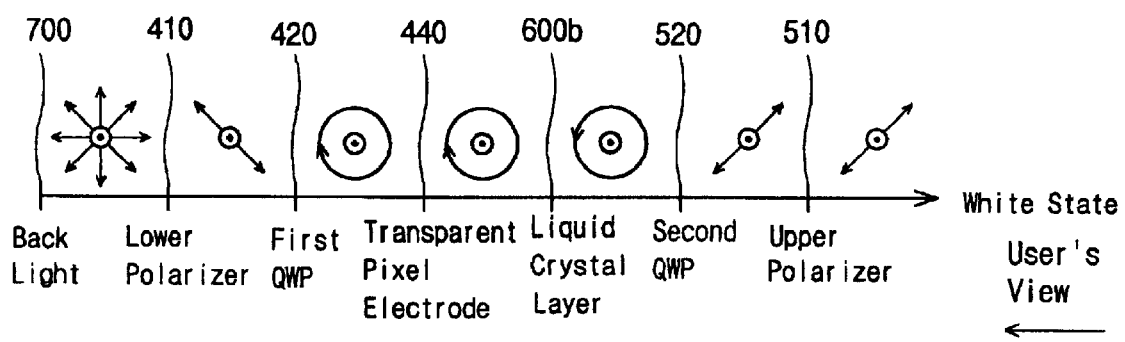
FIG. 8 is a diagram illustrating an off state for a transmissive mode of the inventive transflective LCD device shown in FIG. 6.

FIG. 8 shows a light passage diagram for an off state of the transmissive mode of the transflective LCD device according to the first preferred embodiment. Incident rays from the back light 700 pass through the lower polarizer 410 and are linearly polarized to have a first vibration direction of 135 degrees. That is, the lower polarizer 410 has a first transmittance axis that corresponds to the first vibration direction, such that only a portion of the incident rays that is parallel to the first transmittance axis transmits the lower polarizer 410. Thereafter, first linearly polarized rays pass through the first QWP 420 and are circularly polarized in the left. The left-circularly polarized (LCP) rays subsequently pass through the transparent pixel electrode 440 without a phase change, and are incident on the second liquid crystal portion 600b in off state. The second liquid crystal portion 600b in the off state serves as a half wave plate (HWP) generating a phase difference of $\lambda/2$. Therefore, the LCP rays become right-circularly polarized (RCP) rays. The RCP rays subsequently pass through the second QWP 520, and change to second linearly polarized rays having a second vibration direction of 45 degrees. Then, the second linearly polarized rays are incident on the upper polarizer 510. The upper polarizer 510 has a second transmittance axis that is perpendicular to the first transmittance axis of the lower polarizer 410. Therefore, all the second linearly polarized rays transmit through the upper polarizer 510, and a normally white state for the transmission is achieved.

Figure 4A:
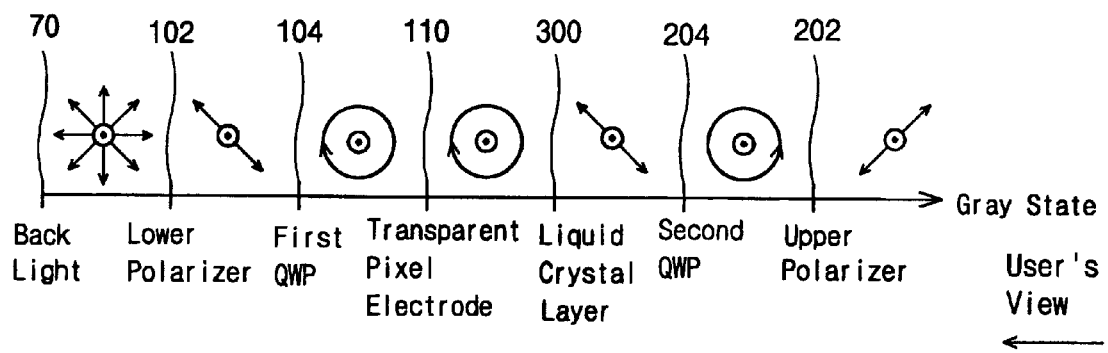
FIGS. 4A and 4B are diagrams, respectively, illustrating off and on states for a transmissive mode of the conventional transflective LCD device shown in FIG. 3.
Figure 4B:
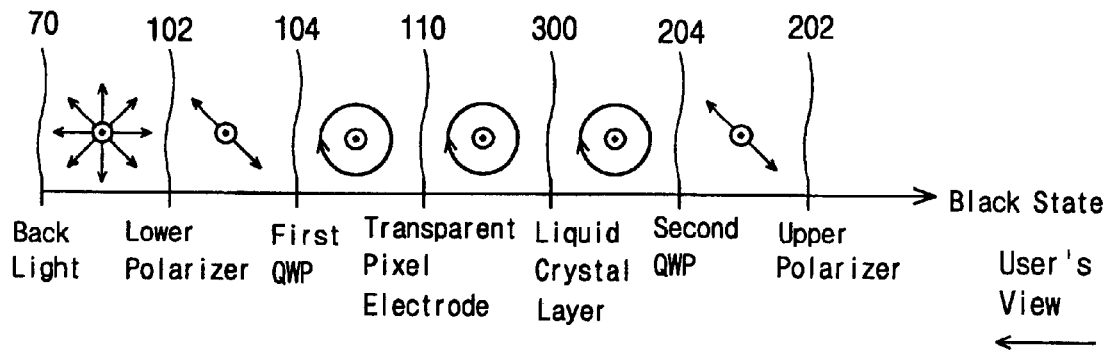
Figure 5A:
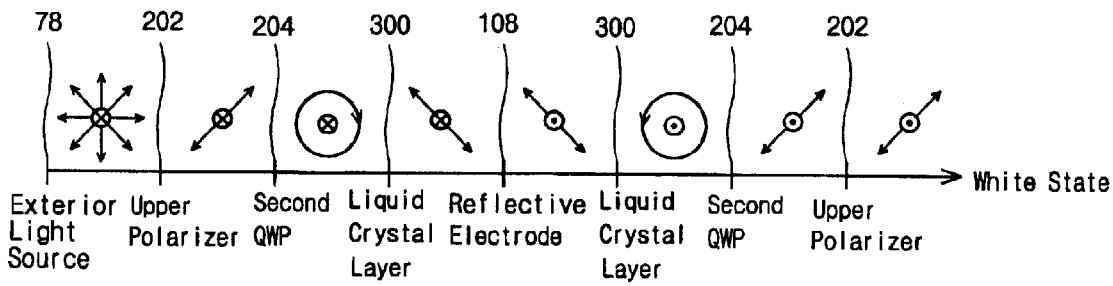
FIGS. 5A and 5B are diagrams, respectively, illustrating off and on states for a reflective mode of the conventional transflective LCD device shown in FIG. 3.
Figure 5B:
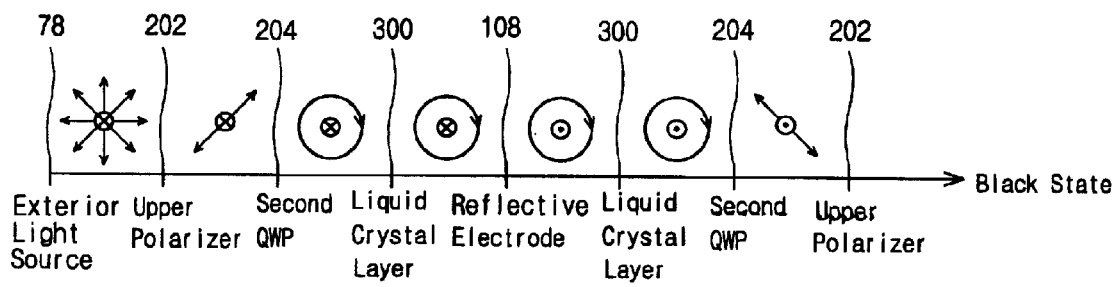

Compared with the conventional gray state for the transmissive mode shown in FIG. 4A, the second liquid crystal portion 600b involves the second phase difference $\lambda/2$ instead of $\lambda/4$ such that a higher luminance is achieved. In addition, the first preferred embodiment has the same reflective mode as the conventional transflective LCD device shown in FIGS. 5A and 5B. The reason is that the first liquid crystal portion 600a involves the same phase difference of $\lambda/4$ as the liquid crystal layer of the conventional transflective LCD device (reference 300 of FIG. 3).

Figure 9:
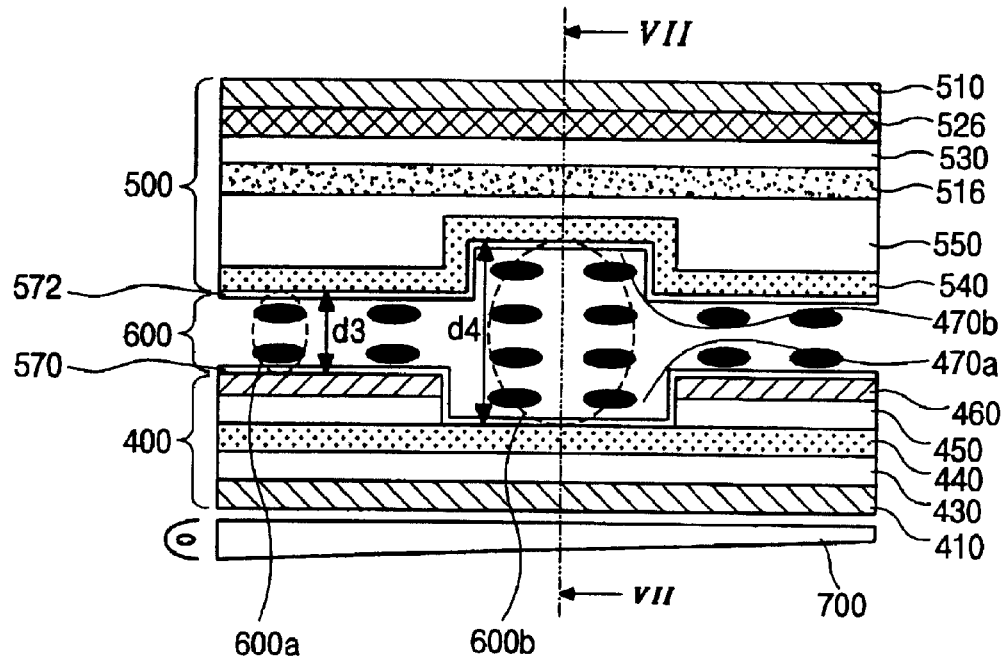
FIG. 9 is a cross-sectional view illustrating a transflective LCD device according to a second preferred embodiment of the present invention.

FIG. 9 shows a second preferred embodiment of the present invention. As shown, instead of the lower and upper QWP's 420 and 520 (see FIG. 6), only a half wave plate (HWP) 526 is used. The HWP 526 is interposed between the second transparent substrate 530 and upper polarizer 510. Since the second preferred embodiment employs only one HWP instead of two QWP's, cost of manufacturing the transflective LCD device decreases.

The second preferred embodiment, normally white and black states for the on and off states are reversed. That is, the second preferred embodiment produces the normally black state for the off state and normally white state for the on state, which is opposite of the operation of the first preferred embodiment shown in FIG. 6.

Figure 10:
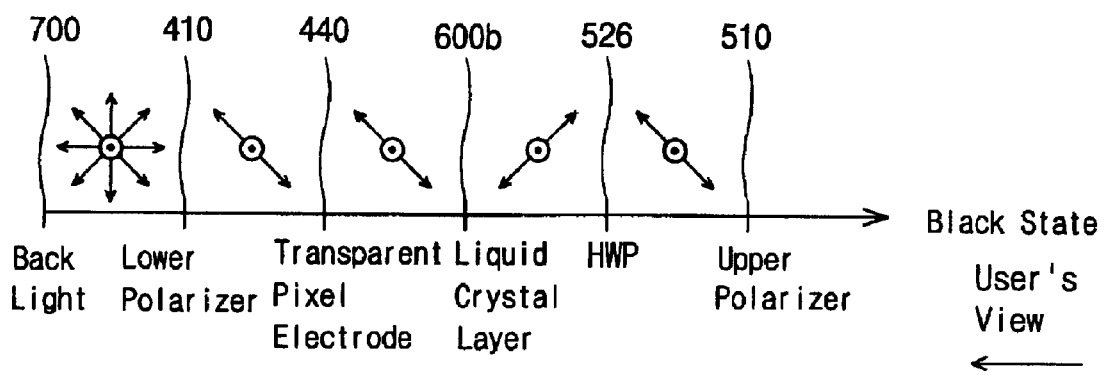
FIG. 10 is a diagram illustrating an off state for a transmissive mode of the inventive transflective LCD device shown in FIG. 9.

FIG. 10 shows a normally black state of the second preferred embodiment. Incident rays from the back light 700 are linearly polarized by the lower polarizer 410 to have the first vibration direction of 135 degrees. The 135 degree-linearly-polarized rays subsequently pass through the transparent pixel electrode 440 without a phase change, and are incident on the second liquid crystal portion 600b. The second liquid crystal portion 600b serves as the HWP such that the 135 degree-linearly-polarized rays change to 45 degree-linearly polarized rays. Then, the 45 degree-linearly-polarized rays pass through the HWP 526 and become 135 degree-linearly-polarized rays again. The 135 degree-linearly-polarized rays subsequently meet the upper polarizer 510 having the second transmittance axis. Since the 135 degree-linearly-polarized rays vibrate perpendicular to the second transmittance axis of the upper polarizer 510, all the rays are absorbed by the upper polarizer 510. Therefore, the normally black state for the transmissive mode of the second preferred embodiment is achieved.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A transflective liquid crystal display device comprising:
    first and second transparent substrates opposing each other;
    a transparent pixel electrode on an inner surface of the first transparent substrate;
    a first passivation layer on the transparent pixel electrode;
    a reflective pixel electrode on the first passivation layer, the reflective pixel electrode having a through hole passing through the first passivation layer such that the through hole exposes the transparent pixel electrode;
    a lower polarizer on an exterior surface of the first transparent substrate;
    a back light below the lower polarizer;
    a color filter layer on an inner surface of the second transparent substrate;
    a second passivation layer on the color filter layer;
    a common electrode on the second passivation layer, the common electrode having a concavity formed toward the upper substrate, the concavity corresponding to the through hole of the reflective electrode;
    a retardation layer on an exterior surface of the second transparent substrate;
    an upper polarizer on the retardation layer; and
    a liquid crystal layer between the common electrode and the reflective pixel electrode, and between the concavity of the common electrode and an exposed portion of the transparent pixel electrode.

2. The device of claim 1, wherein a gap d1 is between the common electrode and the reflective pixel electrode, a gap d2 is between the concavity of the common electrode and an exposed portion of the transparent pixel electrode, and d2/d1 is approximately 1.5 to 2.5.

3. The device of claim 1, wherein a gap d1 is between the common electrode and the reflective pixel electrode, a gap d2 is between the concavity of the common electrode and an exposed portion of the transparent pixel electrode, and d2/d1 is between 1.8 to 2.2.

4. The device of claim 1, wherein the retardation layer is a half wave plate that generates a phase difference of $\lambda/2$.

5. The device of claim 1, wherein the retardation layer is a quarter wave plate that generates a phase difference of $\lambda/4$.

6. The device of claim 5, further comprising a quarter wave plate between the first transparent substrate and the lower polarizer.

7. The device of claim 1, further comprising upper and lower alignment layers directly facing upper and lower surfaces of the liquid crystal layer, respectively.

8. The device of claim 1, wherein the first and second passivation layers are transparent thin films.

* * * * *